United States Patent
Zenner et al.

(10) Patent No.: US 6,391,406 B1
(45) Date of Patent: May 21, 2002

(54) POLYMER COMPOSITIONS CONTAINING OXYGEN SCAVENGING COMPOUNDS

(75) Inventors: Bruce D. Zenner, Vacaville; Charles S. Benedict, Alameda, both of CA (US)

(73) Assignee: W. R. Grace & Co.-Conn., New York, NY (US)

( * ) Notice: Subject to any disclaimer, the term of this patent is extended or adjusted under 35 U.S.C. 154(b) by 0 days.

(21) Appl. No.: 08/783,780

(22) Filed: Jan. 15, 1997

Related U.S. Application Data

(63) Continuation of application No. 08/444,611, filed on May 19, 1995, now abandoned, which is a continuation of application No. 07/962,424, filed on Oct. 16, 1992, now abandoned, which is a continuation-in-part of application No. 07/518,041, filed on May 2, 1990, now abandoned, and a continuation-in-part of application No. 07/581,507, filed on Sep. 12, 1990, now Pat. No. 5,202,052.

(51) Int. Cl.⁷ .............................................. C09K 15/06
(52) U.S. Cl. ........................ 428/35.7; 252/188.28; 252/400.1; 252/407
(58) Field of Search .............................. 428/34.1, 35.7

(56) References Cited

U.S. PATENT DOCUMENTS

| | | | |
|---|---|---|---|
| 2,159,985 A | 5/1939 | Gray et al. ..................... 99/31 |
| 3,135,019 A | 6/1964 | Aichele ..................... 425/126.1 |
| 3,360,827 A | 1/1968 | Aichele ....................... 425/128 |
| 3,547,746 A | 12/1970 | Gwinner ..................... 428/172 |
| 3,577,595 A | 5/1971 | Smith et al. ................. 425/110 |
| 3,586,514 A | 6/1971 | Vljbrief ........................ 426/106 |
| 4,048,361 A | 9/1977 | Valyi ......................... 215/12.2 |
| 4,211,681 A | 7/1980 | Braun et al. ................ 524/111 |
| 4,278,718 A | 7/1981 | Billings et al. ............ 428/66.3 |
| 4,279,350 A | 7/1981 | King ........................... 215/228 |
| 4,287,995 A | 9/1981 | Morita et al. ............... 215/228 |
| 4,380,597 A | 4/1983 | Erwied et al. ............... 524/109 |
| 4,384,972 A | 5/1983 | Nakamura et al. ..... 252/188.21 |
| 4,510,162 A | 4/1985 | Nezat ......................... 426/124 |
| 4,524,015 A | 6/1985 | Takahashi et al. ..... 252/188.28 |
| 4,536,409 A | 8/1985 | Farrell et al. ............... 426/398 |
| 4,652,435 A | 3/1987 | Natsuvme et al. .......... 423/265 |
| 4,702,966 A | 10/1987 | Farrell et al. ................ 428/500 |
| 4,752,002 A | 6/1988 | Takahashi et al. .......... 206/204 |
| 4,756,436 A | 7/1988 | Morita et al. ................ 215/228 |
| 4,820,442 A | 4/1989 | Motoyama et al. ..... 252/188.28 |
| 4,888,032 A | 12/1989 | Busch ............................ 95/44 |
| 4,908,151 A | 3/1990 | Inove et al. ............ 252/188.28 |
| 4,942,048 A | 7/1990 | Nasu et al. .................. 426/271 |
| 4,992,410 A | 2/1991 | Cullen et al. ................ 502/407 |
| 5,021,515 A | 6/1991 | Cochran et al. ............. 525/371 |
| 5,202,052 A * | 4/1993 | Zenner et al. .......... 252/188.28 |
| 5,270,337 A | 12/1993 | Graf ............................ 514/499 |
| 5,284,871 A | 2/1994 | Graf ............................ 514/499 |

FOREIGN PATENT DOCUMENTS

JP    57-194959    11/1982

OTHER PUBLICATIONS

Cort, Antioxidant Properties of Ascorbic Acid in Foods, Advances in Chemistry Series, No. 200, Ascorbic Acid: Chemistry, Metabolism and Uses, 533–550 (1982).
Folland, The Oxbar Super–Barrier System: A Total Oxygen Barrier System for PET Packaging, presented at Europak '89 483–494 (1989).
The Merck Index; An Encyclopedia of Chemicals and Drugs; 9th Edition; 1976; pp. 110, 111 and 1109.

* cited by examiner

*Primary Examiner*—Harold Pyon
*Assistant Examiner*—Sandra Nolan
(74) *Attorney, Agent, or Firm*—Nields & Lemack

(57) ABSTRACT

An oxygen scavenging composition or concentrate of a carrier, such as a polymer, which is permeable to both oxygen and water or water vapor and an oxygen scavenging compound of an organic compound or salt thereof dispersed relatively uniformly throughout the polymer in an amount effective to act as an oxygen scavenger. The oxygen scavenging compound may be an ascorbate compound or a polycarboxylic or salicylic acid chelate or complex of a transition metal or a salt thereof. The oxygen scavenging composition is activated for scavenging oxygen by contact with water or water vapor which permeates into or through the carrier.

14 Claims, No Drawings

POLYMER COMPOSITIONS CONTAINING OXYGEN SCAVENGING COMPOUNDS

This application is a continuation of application Ser. No. 08/444,611 filed May 19, 1995 (abandoned), which is a continuation of application Ser. No. 07/962,424 filed Oct. 16, 1992 (abandoned) which is a Continuation-In-Part of U.S. Ser. No. 07/518,041 filed May 2, 1990 (abandoned) and a Continuation-In-Part of U.S. Ser. No. 07/581,507 filed Sep. 12, 1990, now U.S. Pat. No. 5,202,052.

BACKGROUND OF THE INVENTION

The present invention relates to a polymer composition containing oxygen scavenging compounds therein, for use in packaging beverages, foods, pharmaceuticals and the like. In particular, these polymer compositions have utility as liners or gasketing materials for crowns, closures, lids or caps of various containers such as bottles or cans to prevent oxygen ingress and to scavenge oxygen which is present inside the container, or contained in outside air leaking past or permeating through the polymer composition. These polymer compositions may also be used in the construction of the container, as the container material itself, as a component of a container, or as a barrier layer thereupon or therein, to prevent oxygen ingress therethrough or to scavenge oxygen therein.

In packaging oxygen sensitive materials such as foodstuffs, beverages, and pharamceuticals (collectively "products") oxygen contamination can be particularly troublesome. Care is generally taken to minimize the introduction of oxygen or to reduce the detrimental or undesirable effects of oxygen on the foodstuff or beverage.

Molecular oxygen ($O_2$) can be reduced to a variety of intermediate species by the addition of one to four electrons; these species are superoxide, hydroxy radical, hydrogen peroxide, and water. $O_2$ and water are relatively unreactive: the three intermediate species are very reactive. Also, $O_2$ can be activated to singlet electron state oxygen (which can undergo subsequent reduction to the more reactive oxygen species) by irradiation, or by the presence of catalytic agents. These reactive oxygen species are free radical in nature, and the oxidative reactions in which they participate are therefore autocatalytic.

Carbon-carbon double bonds are particularly susceptible to reaction with the intermediate species. Such carbon-carbon bonds are often found in foods and beverages, pharmaceuticals, dyes, photochemicals, adhesives, and polymer precursors. Virtually any product which has complex organic constituents will contain such carbon-carbon double bonds or other oxygen reactive components, and hence can undergo oxidative reactions. Thus, if the oxidation products adversely affect the performance, odor or flavor of the product, then removing the oxygen which is present (either dissolved in or trapped with the product), preventing oxygen ingress, or inhibiting the reactions of oxygen will benefit the product.

A number of strategies exist to deal with oxygen as a contaminant. The most basic is simply to remove oxygen from the product by vacuum or by inert gas sparging, or both. Such systems are used in boiler water treatment, the orange juice and brewing industries, and in modified-atmosphere packaging of food products. This technology, while somewhat equipment intensive, can remove about 90–95% of the oxygen present in air from the product (or its container) prior to or during packaging. However, the removal of the remaining 5–10% of oxygen using this approach requires longer times for vacuum treatment and/or sparging and increasingly larger volumes of higher and higher purity inert gas which must not itself be contaminated with trace levels of oxygen. This makes the removal (by such methods) of the last traces of oxygen expensive. A further disadvantage of these methods is a tendency to remove volatile product components. This is a particular problem with foods and beverages, wherein such components are often responsible for some or all of the aroma and flavor.

Herein, the term "oxygen scavenger' means materials or chemical compounds which can:

a) remove oxygen from the interior of a closed package by reacting or combining with entrapped oxygen or with oxygen that is leaking into the package interior past the package/closure sealant or gasket;

b) prevent or reduce the perfusion of oxygen through the gasketing/sealant materials between container and closure;

c) prevent or reduce the perfusion of oxygen through the materials of the package/closure itself by incorporation of the oxygen scavenger into the materials of which the container/closure is/are made;

d) prevent or reduce the perfusion of oxygen through the material of the package/closure itself by incorporation of the oxygen scavenger into one or more layers of a multilayer container/closure construction.

The term "antioxidants" as used herein means materials or compounds which, when added to the foodstuff or beverage itself, slow the rate of oxidation or otherwise reduce the undesirable effects of oxidation upon the foodstuff or beverage.

For example, it has been known since the 1930's that oxygen in beer adversely affects its flavor and stability. Amounts of oxygen as low as 0.1 to 0.2 ml per 355 ml container will, over time, cause darkening of the beer, an increase in chill-haze values and significant taste changes. Oxygen's effect on beer is so strongly detrimental that many brewers go to great lengths to remove it from the bottle during the filling process. One usual technique is to (1) remove the air (via vacuum) from a clean bottle; (2) fill the bottle with $CO_2$; (3) flow the beer down the bottle wall into the bottle thus displacing the $CO_2$; and (4) finally, to squirt a jet of high-pressure deoxygenated water into the bottle to cause the beer to over-foam just as the cap is put on (attempting thereby to displace the remaining headspace gases with the beer's own $CO_2$). In addition, to minimize introduction of air (21% $O_2$) into the headspace just before capping, production lines are run more slowly than otherwise necessary. All this is expensive, and usually reduces the total $O_2$ concentration in the headspace to only about 200–400 parts per billion: the desired level is as close to zero as possible, but certainly below about 50 ppb. The 200–400 ppb achieved in the packaged product by careful brewers corresponds to approximately 50–100 microliters of oxygen per 355 ml bottle. Even this small quantity of oxygen is still considered to be one of the major limitations on quality and shelf life of beer today.

Many other food products suffer similar oxygen-mediated degradation; for example, individual portions of prepared foods are marketed in containers made of plastics, and air entrapped therein, and leaking or perfusing into the package after processing, is an acknowledged industry problem. This leakage or perfusion is often especially true for packages made entirely of plastics, because many plastics with otherwise desirable properties are relatively permeable to oxygen. Incorporation of the present invention into the bulk of such plastics, or into one or more layers of a multilayer package, could be beneficial in reducing or eliminating such perfusion. Among obvious benefits of such applications of the invention is extended shelf life.

None of the above techniques remove or control (a) oxygen dissolved in the product (which will outgas into the headspace as the enclosed system comes to equilibrium), or (b) oxygen leakage into the package past the gasket/container interface, or (c) oxygen permeating through the gasket into the interior of the package, or (d) oxygen permeating through the container itself into the package. The present invention also aids in removal of $O_2$ from these other three sources. Furthermore, it is known that free oxygen inside a package may yield very rapid degradation of the product, consequently a desired property of any scavenger is to remove most of the free oxygen as quickly as possible (i.e., ultimate $O_2$ absorption capability is subordinate to fast uptake kinetics).

Antioxidants (such as sulfur dioxide, trihydroxy butyrophenone, butylated hydroxy toluene and butylated hydroxy anisole) and oxygen scavengers (such as ascorbic acid, isoascorbic acid and glucose oxidase-catalase) have been used in an attempt to reduce the effects of oxygen contamination on beer (See e.g., Reinke et al., "Effect of Antioxidants and Oxygen Scavengers on the Shelf-life of Canned Beer," A.S.B.C. Proceedings, 1963, pp. 175–180, Thomson, "Practical Control of Air in Beer", Brewer's Guild Journal, Vol. 38, No. 451, May 1952, pp. 167–184, and von Hodenberg, "Removal of Oxygen from Brewing Liquor," Brauwelt International, III, 1988, pp. 243–4). The direct addition of such agents into beer has several disadvantages. Both sulfur dioxide and ascorbates, when added to beer, can result in production of off-flavors thus negating the intended purpose of the addition. Many studies have been conducted on the effect of such agents on the flavor of beer. (See e.g., Klimowitz et al., "The impact of Various Antioxidants on Flavor Stability," MBAA Technical Quarterly, Vol. 26, pp. 70–74, 1989 and Gray et al., "Systematic Study of the Influence of Oxidation on Beer Flavor," A.S.B.C. Proceedings, 1948, pp. 101–112.) Also, direct addition of such compounds to a food or beverage requires stating on the label that the product contains the additive. This is somewhat undesirable in today's era of "fresh" and "all-natural" products.

It is also known in the art to prepare plastic containers (e.g., for beer, other beverages and various foods) wherein a wall comprises, or includes a layer which comprises, a polymer, an oxidizable component having oxygen-scavenging properties, and a metal catalyst, for binding any oxygen penetrating the container wall (see, e.g., Folland, the OXBAR Super-Barrier System: A Total Oxygen Barrier System for PET Packaging, "EUROPAK '89, Oct. 30–Nov. 1, 1989, and European Patent Application 301,719). Also, U.S. Pat. No. 4,048,361 discloses a food container having at least one barrier layer which contains an oxygen "getter," while U.S. Pat. No. 3,586,514 discloses a thin wall polyvinyl chloride container wherein the plastic contains a quantity of an antioxidizing agent to reduce oxygen permeability therethrough, and Japanese patent application 58-160,344 discloses hollow moldings of a polyethylene terephthalate ("PET") with a meta-xylene group containing polyamide resin. The containers described in these references are described as oxygen barriers which prevent or reduce the transmission of oxygen through the wall and into the container. Such products are generally more expensive than glass containers and are less likely to be recycled than glass or aluminum containers.

Attempts have been made to incorporate oxygen scavenging systems in a container crown or closure. For example, U.S. Pat. No. 4,279,350 discloses a closure liner which incorporates a catalyst disposed between an oxygen permeable barrier and a water absorbent backing layer. Another closure is disclosed in UK Patent Application 2,040,889. This closure is in the form of a stopper molded from ethylene vinyl acetate ("EVA") having a closed-cell foamed core (which may contain water and sulfur dioxide to act as an oxygen scavenger) and a liquid impervious skin. Also, European Patent Application 328,336 discloses a preformed container closure element, such as a cap, removable panel or liner, formed of a polymeric matrix containing an oxygen scavenger therein. Preferred scavengers include ascorbates or isoascorbates, and their scavenging properties are activated by pasteurizing or sterilizing the element after it has been fitted onto a filled container. Similarly, European Patent Application 328,337 discloses a sealing composition for a container closure comprising a polymeric matrix material which is modified by the inclusion therein of an oxygen scavenger. These compositions may be in fluid or meltable form for application to a closure or to be present as a deposit on the closure in the form of a closure gasket. Ascorbates or isoascorbates, alone or in combination with sulfites, are preferred oxygen scavengers. Again, the scavenging properties of these compounds are activated by pasteurizing or sterilizing the deposit when sealing a container with the gasket on a closure or metal cap.

Ferrous oxide has been used commercially as an oxygen scavenger for food applications. It is currently manufactured in sachets or packets by a number of firms including Mitsubishi Gas Chemical, Inc., which markets it in a product known as AGELESS™. (See, e.g., European Packaging Newsletter and World Report, Vol. 21, No. 7, July, 1988.) Such products may also contain ascorbates as an oxygen scavenging agent, per U.S. Pat. No. 4,752,002. Also, U.S. Pat. No. 4,524,015 discloses the use of a granular mixture of an ascorbate or ascorbic acid, an alkali metal carbonate, an iron compound, carbon black, and water, and U.S. Pat. No. 4,384,972 discloses a foodstuff freshness keeping agent of a particulate composition that contains a salt of a metal, an alkali substance, a sulfite or other deliquescent compound, and optionally, ascorbic acid or a salt thereof.

While such products are effective at removing oxygen from within packages of breads, cookies, pasta, coffee and other relatively dry foodstuffs, they have significant drawbacks. They (a) are hygroscopic and water soluble to some extent, (b) function less effectively in high $CO_2$ environments, (e.g., beer containers), (c) in order to preserve their activity, they must be carefully sequestered from air (or other oxygen-containing environments) until use, and (d) they require a sachet or packet, often of multilayer construction, for proper storage and handling of the oxygen scavenger.

U.S. Pat. Nos. 4,536,409 and 4,702,966 each disclose a multilayer wall construction for a polymeric container to be used to pack comestibles, wherein outer and inner layers are structural and protective layers: positioned therebetween are materials designed to control the unwanted permeation of oxygen. Preferably, the outer and inner layers are olefinic and resistant to the transmission of water vapor at room temperature, but at elevated temperatures, they permit water vapor to permeate into the oxygen absorbing system to trigger such system to an active state which is capable of absorbing oxygen. While this construction is useful from the standpoint of retaining the oxygen absorbing system in a dormant state until it is needed, such construction requires heat to render the inner and outer layers permeable to water vapor which can trigger or activate the oxygen absorbing system.

Consequently, there is a need for a material or product which can rapidly reduce oxygen levels inside a package of products which are wet or moist (or which are capable of generating moisture inside their packaging) without adversely changing taste, aroma, or functionality of such packaged foodstuffs, beverages and pharmaceuticals. Persons skilled in the art have considered the addition of various agents into the packaging of such products in an attempt to meet this need.

Japanese patent application 61-238,836 discloses a packaging film made from a thermoplastic such as low density polyethylene ("PE"), which includes ascorbic acid alone or in combination with an aliphatic polycarboxylic acid. This film is disclosed as having good gas barrier properties.

Japanese patent application 54-022,281 discloses a fruit tray made of a thermoplastic foam base having a thin layer of ascorbic acid or erythorbic acid (or one of their alkali metal salts) on the face of indentations in the tray upon which the fruit is to be placed.

New oxygen absorbing and scavenging materials are also being developed by Aquanautics, Inc., Alameda, Calif. (See Packaging Technology, "Oxygen Eliminator Extends Shelf Life," 1989 and "Extending the Life of a Bottle of Beer," New York Times, Mar. 29, 1989). These materials are transition metal complexes, particularly (but not exclusively) those complexes formed between transition metals and "polyalkylamines" (as disclosed in U.S. Pat. No. 4,959,135, which is expressly incorporated herein by reference thereto), as well as those complexes formed between transition metals and "macrocyclic amines" (as disclosed in U.S. Pat. No. 4,952,289, which is expressly incorporated herein by reference thereto).

These "amine+metal" complexes can bind ligands such as oxygen and can be used as oxygen scavengers in packaging. The complexes either do not form or do not become activated (i.e., cannot, or do not, bind oxygen) until the amine and metal are together exposed to water or water vapor. The ingredients of the complex can be mixed and used either free, or immobilized on or within a support inter alia, on or mixed with silicone rubber or with a polymer such as polyvinyl chloride ("PVC"), EVA, polypropylene ("PP"), PE or polyurethane (see e.g., U.S. patent application Ser. No. 07/317,172, filed Feb. 28, 1989, the content of which is expressly incorporated herein by reference thereto, wherein one use for such complexes is as an oxygen scavenger in sealing compositions and structures for beer bottle crowns).

Salicylic acid complexes and their reactivities towards oxygen are generally known and are described in Zanello et al., *Inorganica Chim. Acta* 1983, Vol. 74, pp. 89–95 and Cini et al., *Inorganica Chim. Acta* 1984, Vol. 88, pp. 105–113.

U.S. Pat. No. 4,287,995 discloses a sealing member for a container which is used to preserve aqueous liquids therein. This sealing member is mounted on the cap or stopper of the container on the portion facing the contents. The sealing member contains an oxygen absorbent which is separated from contacting the contents of the container by a film which has a plurality of fine openings such that it is gas-permeable but water-impermeable at one atmosphere pressure.

U.S. Pat. No. 4,510,162 discloses an oxygen absorbent composition comprising iron particles, yeast and moisture, which mounted on a suitable carrier and adapted to be mounted in a closable container for removing oxygen therefrom.

U.S. Pat. No. 4,756,436 discloses a construction for an oxygen scavenging composition to be installed in a cap upon a liquid substance containing vessel. This construction includes an upper, vacant compartment, a lower compartment containing the oxygen scavenger, and a partition therebetween. The partition is made of single or plural sheets of gas permeable liquid-proof material to provide a barrier between the oxygen scavenger and the liquid substance.

Current crown liner technology includes the in situ molding of a thermoplastic liner material directly in the crown which will later be used for bottling beer or other beverages. Such liners are primarily made of PVC in the United States and of thermoplastics which do not contain chlorine (such as EVA or PE) in Europe and Japan.

PVC compositions, with or without additives as stabilizers or for imparting certain properties, are known in the art. For example, U.S. Pat. No. 4,380,597 discloses a stabilized thermoplastic composition of PVC (or mixed polymers) which may include ascorbates or gluconates as stabilizer additives. These stabilizers are added not to absorb oxygen from inside packages made of the polymer, but to prevent breakdown of the polymer itself. U.S. Pat. No. 4,211,681 discloses shaped articles (e.g., films or tubes) which include high molecular weight poly (ethylene oxide) polymers with stabilizers of ascorbic acid, 2,3-butyl hydroxyanisoles, and the like.

Japanese patent application 62-215,010 discloses a deodorizing fiber obtained by treating thermoplastic fibers with inorganic particles of divalent ferrous iron and L-ascorbic acid. U.S. Pat. No. 4,278,718 discloses a sealing composition for beverage containers consisting essentially of a vinyl chloride resin, a plasticizer, and a metal oxide.

Today there is a need for oxygen-scavenging thermoplastic compositions for use in oxygen-scavenging systems for packaging beverages, foods, pharmaceuticals and other products. The oxygen-scavengers in such systems should rapidly reduce oxygen levels within the package (and/or in the goods themselves), as well as prevent oxygen ingress into the package. There is a particular need for such systems where the internal environment of the package is (or can become) wet or moist. Most advantageously, the oxygen-scavengers of such systems would remain inactive until after the product is packaged. One particular need for such a composition is a liner for beer bottle crowns wherein the oxygen-scavenging properties of the liner do not become active until after the bottle is crowned.

Other particular uses of such a composition may involve dry products packaged under low relative humidity. In such cases, the compositions of this invention may be activated by application of water or water vapor to the composition itself immediately prior to sealing of the container. For example, in the case of a dry product to be sealed in a container by means of a screw-on lid with a gasket comprising a composition of this invention, activation moisture might be provided by a water-mist spray, by dipping in water, by exposure of the lid to a water-vapor-saturated atmosphere, or by incidental exposure to steam during pre-capping sterilization. The present invention provides certain compositions and formulations as solutions to these general needs, and specifically for bottled beverages including beer.

SUMMARY OF THE INVENTION

This invention teaches the preparation and use of certain oxygen scavenging materials dispersed in various carriers, such as polymers or plastics, and used in packaging as oxygen scavenging compositions. These compositions, by virtue of novel and unexpected increases in oxygen uptake rates of the oxygen scavenging material, are useful in preventing deterioration or reaction of the packaged substances due to exposure to oxygen in the package.

In one embodiment of the invention, the oxygen scavenging composition comprises a carrier, such as a polymer, preferably a thermoplastic polymer, which is permeable to oxygen and water or water vapor; an organic compound, added in an amount sufficient to act as an effective oxygen scavenger and which is capable of reacting with oxygen being dispersed relatively uniformly through the carrier; and a catalyzing agent in an amount sufficient to increase the rate of oxygen uptake by the organic compound in order to provide rapid initial oxygen scavenging.

Preferred organic compounds include D- or L-ascorbic acid or a salt or fatty acid derivative thereof (i.e., D- or L-ascorbates). Isoascorbates or erythrobates may also be used, but most preferably, the organic compound is sodium L-ascorbate, since it is readily available and known to be safe for contact with foodstuffs or beverages.

The catalyzing agents for these ascorbates includes any transition metal, compound, complex or chelate. The transition metal is preferably chosen from the group comprising iron, copper, cobalt, or nickel, and most preferably it is either iron or copper. The transition metal may preferably be supplied either (1) as a compound such an ordinary salt, or (2) as a polyalkylpolyamine ("PAPA") chelate, macrocyclic amine ("macrocycle") chelate, an amino polycarboxylate chelate, or a salicylate chelate of a transition metal ion. It is also possible to instead utilize other transition metal chelates or complexes which contain one or more amine, hydroxyl, carboxylate or sulfhydryl groups, or combinations thereof.

Simple transition metal salts such as ferrous or ferric chloride, cuprous or cupric chloride, ferrous or cupric sulfate, ferrous gluconate, nickel sulfate, or cobalt chloride, are suitable as catalyzing agents for the ascorbates, and of-these salts, cupric or ferric sulfates are preferred. The transition metal chelates are particularly useful because, when utilized in the appropriate amounts, they possess oxygen scavenging properties which augment the oxygen scavenging properties of the ascorbate compound, thus making the transition metal chelate a secondary scavenging compound, while the transition metal ion in the chelate or complex can catalyze the oxygen scavenging activity of the ascorbate compound.

Of the chelated ion complexes, transition metal chelates of ethylene diamine tetracetic acid ("EDTA") are advantageous, with monoferrous disodium EDTA [$Fe^{++}$/EDTA/$2Na^+$] being the most preferred. Transition metal chelates of polyalkylpolyamines are also useful, with those amines having symmetrical-length carbon chains between adjacent nitrogen atoms being preferred. The most preferable of those amines have symmetric carbon chains which each comprises between one and four, and optimally two, carbon atoms. Transition metal chelates of salicylates or salicylate salts can also be used in practicing this invention. As noted above, each of these chelates provides oxygen scavenging activity to augment that of the ascorbate, while the transition metal ion catalyzes the ascorbate compound when exposed to moisture.

In another embodiment of the invention, the oxygen scavenging composition comprises a transition metal complex or chelate of a polycarboxylic or salicylic acid dispersed relatively uniformly through the carrier and added in an amount sufficient to act as an effective oxygen scavenger. The polycarboxylic acid is preferably an amino polycarboxylic acid, and most preferably EDTA. Other useful polycarboxylic acids include ethylene diamine triacetic acid, hydroxyethylene diamine triacetic acid, diethylene triamine pentaacetic acid or trans-1,2-diamino cyclohexane tetraacetic acid.

It is also possible to utilize other polycarboxylic acids, such as citric and oxalic acids, which are capable of forming a chelate with the transition metal. Such polycarboxylic acids may also contain one or more amine hydroxyl, carboxylate or sulfhydryl groups, or combinations thereof. Alternatively, transition metal chelates or complexes of salicylic acid or salicylates, whether or not substituted, can also be used instead of the amino polycarboxylic compounds. Salts of any of these acids are also suitable.

Again, the transition metal of the chelate is preferably iron, copper, cobalt, or nickel; most preferably it is either iron or copper. The transition metal used to make the chelate or complex may be supplied as a simple salt, such as iron or copper chloride, iron or copper sulfate, iron gluconate, nickel sulfate, or cobalt chloride, but is present as part of the chelate or complex.

It is also possible, and in some cases preferred, to include a reducing agent, such as an ascorbate compound, in the polymer in an amount sufficient to enhance, preserve or augment the oxygen scavenging properties of the transition metal chelate or complex. The ascorbate reduces the oxidation state of the transition metal ion of the chelate so that the ion can be oxidized when the chelate contacts oxygen. This enhances the oxygen scavenging properties of the chelate. A particularly, preferred combination illustrates this embodiment of the invention is monoferric monosodium EDTA [$Fe^{+++}$/EDTA/$Na^+$] in combination with sodium ascorbate as a reducing agent. Ascorbic acid, in its D- or L-form, or a derivative, analog or salt thereof, as described above, may be used as a preferred reducing agent, since it has oxygen scavenging properties.

Preferred polymers for use as carriers include polyolefins, PVC, polyurethanes, polyamides and elastomers. PVC, EVA and PE are typically utilized, but PET, PP, and other olefins, ethylene/alpha-olefin copolymers, ethyl octene copolymers, various thermoplastic (or other) polyurethanes, elastomers, such as isoprene rubber, nitrile rubber, chloroprene rubber, silicone rubber, or other rubber analogs, and other thermoplastic materials such as chlorinated polyethylene ("CPE"), SURLY™, or various combinations or mixtures thereof, are acceptable. In addition, sprayed or dipped coatings of epoxies, polyesters or other conventional coating materials are useful as carriers for the oxygen scavenging compositions of the invention.

The most preferred polymers or other materials which may be used as the carrier are those which are pervious to water vapor at room temperature, so that exposure to elevated temperatures is not necessary to activate the oxygen scavenging capabilities of the composition. The oxygen scavenging material is uniformly dispersed in and throughout the carrier by a direct mixing technique. Advantageously, the oxygen scavenging material is mixed or blended into the carrier in a dry state. The oxygen scavenging capabilities of these compositions are later activated by contact with water or water vapor which permeates into or through the carrier. The water vapor may be provided by the package contents or, for dry contents, may be introduced separately before sealing the package.

Another embodiment of the invention relates to a package (for, e.g., a foodstuff, beverage, or pharmaceutical product) comprising means for supporting or retaining the product, and an oxygen scavenging composition material in contact with the product (or in contact with the environment between the product and the package) for scavenging oxygen therefrom so as to avoid detrimental effects to the performance, odor or flavor properties of the product.

The oxygen scavenging composition may be present on an inside surface of the product supporting or retaining means. This means can be in the form of a carrier film, with the oxygen scavenging composition being dispersed relatively uniformly throughout the carrier film. If desired, one or a plurality of polymer films may be used, with at least one layer of adhesive or binder therebetween, with the oxygen scavenging composition being present in at least one of the polymer films or layers. Also, the oxygen scavenging composition can be applied as a coating or lining upon the inside surface of the product supporting or retaining means to function as a barrier to oxygen permeation.

The invention also relates to containers for water-containing foodstuff, beverage, chemical or pharmaceutical products comprising means for retaining the product and having at least one opening therein for filling or dispensing of the product; a member for closing the opening and preventing escape of the liquid product when not desired; and a liner or gasket comprising one of the oxygen scavenging compositions described above and being positioned adjacent the closing member. Preferably, the retaining means is a can, jar or bottle, the closing member is a crown or closure, and the polymer of the liner or gasket comprises a polyurethane, PVC, EVA or PE. The retaining means may also be a metal can or glass jar, with the closing member being a lid therefore. In this variation, the oxygen scavenging composition may be applied to the lid in the form of a ring, a spot, or coating. Also, the oxygen scavenging composition may be applied to the interior of the can as a coating, generally of an epoxy or polyester carrier. When a metal can is used, it is usually provided with a seam. Thus, it is possible to apply the oxygen scavenging compositions of the invention as a sealant in or upon the seam to prevent oxygen ingress into the can through the seam.

Another embodiment of the invention relates to an oxygen scavenging container which may be made from any one of the compositions of the invention described above. Yet another embodiment relates to a multilayer container or closure where one or more layers comprise the oxygen scavenging compositions of the invention. Also, these compositions may be used as a sealant for, or in an article trapped by the closure methodology for packaging which does not include an identifiable closure which is differentiable from the material of the container itself.

In another aspect of the invention, an oxygen scavenging concentrate is provided. The concentrate may contain many of the same ingredients described above in connection with the oxygen scavenging compositions. For example, in some embodiments, the concentrates include a carrier, an oxygen scavenging material, and a catalyzing agent. The concentrates depart from the compositions described above by having substantially higher concentrations of active components, i.e. oxygen scavengers and catalysts. In preferred embodiments, the concentrates of this invention contain about 10 to 50% oxygen scavenging material and about 0.3 to 8% catalyzing agent, depending, of course, on the desired use of the concentrate and the particular components employed. In one specific embodiment, the concentrate includes about 10 to 50% by weight sodium ascorbate and about 0.3 to 8% by weight copper sulfate in a polyethylene carrier. Of course, other carriers such as ethylene vinyl acetate or polyvinyl chloride are suitable for many embodiments.

In a further aspect of the invention, a two-part composition and method for using such composition is provided. The two-part system includes separate oxygen scavenger and catalyst concentrates which are combined to obtain the final reactive composition. In some embodiments, additional base resin is added to dilute the concentrates during the combination step. Each concentrate includes a carrier that is typically a resin or other material described in connection with the embodiments described above. The concentrates also include either an oxygen scavenging material or catalyzing agent (as described above), but not both. Thus, the oxygen scavenger concentrate includes an oxygen scavenging material dispersed throughout a carrier that is substantially free of catalyst. Likewise, the catalyst concentrate includes a catalyst dispersed throughout a carrier that is substantially free of oxygen scavengers. In this context, a composition is "substantially free" of a component when that component is present in a sufficiently small quantity that it has no effect on the desired activity of the composition. Thus, for example, an oxygen scavenger concentrate that is substantially free of catalyst can be extruded and quenched in water without undergoing reactions that consume the oxygen scavenger.

A further understanding of the nature and advantages of the inventions herein may be realized by reference to the remaining portions of the specification and the attached drawings.

DETAILED DESCRIPTION OF THE INVENTION

The oxygen scavenging compositions of the invention include certain preferred combinations of oxygen scavenging and catalyzing agents which are added to and dispersed in and throughout a carrier for these agents.

The most preferred oxygen scavenging agent of the invention is an ascorbate compound which is used in combination with a transition metal chelate of EDTA. The term "ascorbate compound" is used to include ascorbic acid in either its D or L form and any derivative, analog or salt thereof, including erythorbic acid. In particular, D- or L-ascorbic acid, and their sodium, potassium or calcium salts, or fatty acid derivatives may be used in this invention. Certain of the above, especially the sodium ascorbate salts, are particularly preferred since these materials are widely accepted for contact with food and have achieved "Generally Recognized As Safe" (or "GRAS") status with the U.S. Food and Drug Administration for such applications.

An advantage in practicing this invention is that the oxygen scavenging compositions do not become active for scavenging oxygen until they contact water or water vapor. Thus, the selected composition or compound is dispersed relatively uniformly throughout a carrier which is permeable both to oxygen and water or water vapor. Thereafter, when the carrier is used in an application adjacent to or in the vicinity of a water bearing foodstuff, pharmaceutical, chemical, or beverage, water or water vapor will permeate into the carrier and thus activate the ascorbate compound for removal of oxygen. By retaining the carrier in a dry environment prior to use, the oxygen scavenging compound will remain essentially dormant until activated. For dry products, the oxygen scavenging ability of the compound or composition may be activated by exposure to non-product water or water vapor before sealing the container.

The inclusion of a catalyzing agent with the ascorbate compound greatly enhances the rate of oxygen scavenging after the ascorbate compound is activated by exposure to water or water vapor. It has been found that a transition metal compound, in the form of an organic or inorganic salt, or as a complex or chelate, is useful in accelerating (i.e., catalyzing) the rate of oxygen scavenging by an ascorbate compound. The preferred catalysts include the transition metal chelates of EDTA. The most preferred catalysts are the iron complexes of EDTA or sodium salts thereof. Monoferrous disodium EDTA [$Fe^{++}$/EDTA/$2Na^+$] and monoferric monosodium EDTA [$Fe^{+++}$/EDTA/$Na^+$] are the most preferred chelate. It is also suitable to use a simple iron or copper salt, such as iron chloride or sulfate or copper chloride or sulfate. Typically, the carrier is mixed with the ascorbate compound for uniform dispersion throughout the carrier. Subsequently the catalyst is added to form the desired composition which is activated by contact with water or water vapor which permeates the carrier. The combination of an ascorbate and transition metal compound enables the ascorbate compound to be oxidized rapidly at low pH values (e.g., at pH values between 4 and 5) which are typically encountered in many foods including bottled beer and many fruit juices.

In another embodiment of the invention, the oxygen scavenging component may be any one of a wide variety of transition metal chelates or complexes of polycarboxylic acids. Amino polycarboxylates, such as EDTA, and other polycarboxylates, optionally containing hydroxyl moieties, as well as their salts or other derivatives, are representative examples of preferred compounds which can be complexed with lower oxidation states of transition metal ions and used in this invention. Transition metal chelates of hydroxyethylene diamine triacetic acid, diethylene tridmine pentacetic acid, or trans-1,2-diamino cyclohexane tetracetic acid can also be used as suitable oxygen-scavenging compounds. Other transition metal chelates containing one or more amine, hydroxyl, carboxylate or sulfhydryl groups, or combinations thereof, may also be used.

These chelates are effective oxygen scavengers because the transition metal ion of the chelate becomes oxidized when the chelate contacts oxygen. It is well known that elements such as the transition metals can exist in any one of a number of oxidation states. Thus, the use of lower oxidation of transition metal ions is necessary for an appropriate degree of oxygen scavenging. This lower oxidation state can be achieved in two ways: one is to utilize chelates state transition metals in their lowest oxidation state (e.g., ferrous, cuprous, etc). Alternatively, when the transition metals are present in the chelate in their higher oxidation states (e.g., ferric, cupric, etc.), a reducing agent can be used to covert the metal ion to a lower oxidation state thus imparting oxygen scavenging properties to the chelate. As noted above, the preferred reducing agents are the ascorbates.

In a further embodiment of the invention, a transition metal (preferably iron) chelate of a particular salicylate salt, in particular $Fe^{+++}/Sal_3/3Na^+3NaCl$ where Sal

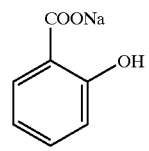

can be used as the oxygen-scavenging material. Instead of this material, a wide variety of other salicylates can be used, including

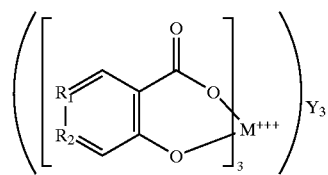

were M is a transition metal, Y is an alkali metal such as Na, K, Ca or H, and $R_1$ and $R_2$ are carbon atoms or part of a benzene ring, or

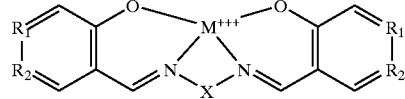

where M is a transition metal, X is $(CH_2)_m Z(CH_2)_m$ with m being an integer, Z is N or C=C with the proviso that if Z is N then N is also bonded to M, and $R_1$ and $R_2$ are carbon atoms or part of a benzene ring.

These salicylates are effective as oxygen scavengers because they react with oxygen to become oxidized. In addition, selection of a transition metal in its lower oxidation state enhances the oxygen scavenging performance of these chelates. As noted above, if transition metals in their higher oxidation state are utilized in these chelates, the oxygen scavenging properties of the chelate can be further enhanced by the incorporation of a reducing agent into the composition. Again, the ascorbates are preferred reducing agents for the reasons given above.

A wide variety of carriers (or mixtures thereof) may be used in accordance with the teachings of the present invention. For use in applications such as crown or closure liners, the carrier is preferably a polymeric thermoplastic, such as PVC, EVA, PET, PE or PP, or polyurethane. As noted above, PVC liners are well known for use in crowns. There is also well-known technology for making aluminum or plastic closures containing-EVA liners. Thus, one of the preferred uses of the compositions of the invention is a liner or gasket in a crown or closure for capping a beverage bottle. Entire closures may also be made of plastics containing the compositions of the invention (e.g., all-plastic screw-on threaded caps for soft-drink bottles, and the like).

In addition to its use as a crown or closure liner, the compositions of the invention may also be used in the form of a film for packaging materials. Such films are preferably made of PE, PP, PVC, or SURYLY™, a DuPont Corporation polymer. The oxygen scavenging compositions of the invention could also be used for forming containers; in this situation the polymer is preferably PET, PVC, or PE. Other polymers which are contemplated by the invention include silicones as well as elastomers such as isoprene rubber and its rubber-like analogs: nitrile rubber, chloroprene, EPDM, etc. Silicone rubber can also be used in some situations. The only requirements of the polymer are that it can be processed in a manner which allows the oxygen-scavenging composition to be dispersed relatively uniformly throughout and that the polymer be permeable to oxygen and water or water vapor.

Another application of the compositions of the invention would be as a sachet, packet or pellet which is mounted on a support and then attached to a crown or other container lid or to the container itself in the form of an article, such as a ring or spot, or as a coating. Thus, the compositions can be applied to a wide variety of jar lids and caps which are used for retaining food substances therein. Again, however, one preferred use of the compositions of the invention is in connection with foodstuffs which contain water so that the oxygen-absorbing compounds may be activated by contact with water or water vapor which permeates into the polymer. The compositions may also be used with dry products by pre-activating the composition via exposure to water or water vapor shortly before sealing the container.

Other uses for the compositions of the invention will be readily apparent to those of skill in the art. By way of example, the uses include metal (i.e., aluminum or tinplate) cans for beverages. It is also contemplated to prepare plastic bottles or other styles of containers (e.g., tubs, cans, etc.) from or incorporating the compositions of the invention. Another preferred use of the composition of the invention is as a gasket or liner applied to an aluminum or plastic closure or metal crown for plastic or glass bottles. The oxygen scavenging composition of the invention may also be incorporated into the materials used as an adhesive between adjacent layers of plastic or incorporated into the adhesive which holds adjacent layers together.

Other embodiments of the present invention are readily apparent to those skilled in the packaging arts, all of which embodiments fall within the scope of the invention and are intended to be included therein. For instance:

1) Many packages are constructed of transparent plastic films so that the product may be seen by the purchaser. Such packages usually have printed decoration incorporated therein, often actually printed on a central layer of a multi-layer film so as to avoid the possibilities of both ink-contamination of package contents and rubbing off of the printing during handling. An oxygen-scavenging composition of the present invention might be unobtrusively incorporated into such a package by being printed onto the central layer underneath the decorative or informative printing.

2) For other packages which do not comprise a separate closure (e.g., sterile or refrigerated "brick-packs" such as often used for fruit juices and the like; gable-top packages such as milk cartons; containers made to have the contents expressed therefrom and not be resealed, such as individual portions of condiments; or various film or foil bags made to be torn open and not resealed, such as potato chip bags) a composition of the present invention may be incorporated into the sealant or gasketing material used to hold the package closed. For example, oxygen-scavenging compositions of this invention can be printed onto the head space region of the package. Alternatively, the compositions can form a laminated insert in the package.

3) Likewise, the composition of this invention might be applied as a paint or coating attached to the interior of the container, or as a tape or similar item protruding into or exposed to the interior of the package and mechanically held in place by the closing mechanism or technique.

4) There may be instances in which the oxygen scavenger compositions of the present invention must be separated from the product: in such cases the compositions may again be incorporated into an interior layer of a multilayer container.

5) The compositions of this invention may conveniently be combined with solutions to other manufacturing problems. For example, a common problem in plastics manufacturing today is to safely recycle previously-used plastic plastics into food-safe containers. Much recycled plastic may have been used as containers for random unknown materials, and the recycled plastics may therefore contain traces of materials not acceptable for food contact, and may also be composed of an admixture of plastics highly and minimally pervious to oxygen. Use of such recycled materials, combined with the compositions of this invention, as an inner layer in multiple-layer container construction would allow much easier use of mixed-recycle materials.

In the plastics manufacturing art, "master batches" or concentrates of various sorts are sometimes used in the preparation of final mixtures of materials for eventual use in manufacturing finished articles. In the present invention, preparation and use of highly concentrated forms of oxygen control chemicals in carrier (e.g., PVC, plastisol, epoxy can coatings, gasketing, spray, roll-on, and dip coatings, and the like) is convenient in the manufacture of the composition which will eventually be used as final oxygen-scavenging compositions of this invention. The present invention lends itself readily to such practices, which are fully within the scope contemplated for the invention.

The resin concentrate form of this invention is particularly useful for shipping and storing oxygen scavenging compositions. It is much easier to handle than the uncombined oxygen scavenger and catalyst powders, and it is lighter and therefore more convenient to ship and store than the final diluted compositions. Further, it is easier to protect concentrates against humidity conditions which could prematurely inactivate component ingredients. For example, the concentrate can be shipped in sealed 55 pound bags. When the final fitment, film, or other form of the composition is to be produced, the concentrate is diluted with a base resin to obtain an oxygen scavenging composition having the concentration and form required for the end product. For example, the end user can combine the concentrate with a base resin in appropriate processing machinery.

In preferred embodiments, the concentrate is diluted in a ratio of between about 1:38 and 1:1, and more preferably between about 1:13 and 1:1 concentrate to base resin. In these concentrate formulations, it is preferred to use an amount of oxygen scavenging compound ranging from about 10 to 50% by weight and more preferably from about 20 to 40% by weight (i.e., between about 500 and 2500, and preferably between 1000 and 2000 micromoles of scavenger compound per gram of polymer for compounds having molecular weights of between 200 and 500 grams per mole). When an ascorbate is used as the scavenger, the catalyzing agent of the transition metal element compound or complex may be used in an amount of about 0.3 to 8% by weight (i.e., between 40 and 200 micromoles per gram of polymer). More preferably, the catalyzing agent is used in an amount of about 0.6 to 2% by weight.

In some preferred embodiments, two separate concentrates are employed, one containing the oxygen scavenging compound and the other containing the catalyst. The oxygen scavenging compound is preferably present at a concentration ranging from about 10 to 50% by weight and more preferably from about 20 to 40% by weight in the first concentrate. The catalyzing agent is preferably present at a concentration ranging from about 0.3 to 8% by weight and more preferably from about 0.6 to 2% by weight in the second concentrate. The carrier resin in the two concentrates may be different but they should be compatible with each other in the final oxygen scavenging composition. The two concentrates are combined in a ratio that depends upon the particular application. By providing separate concentrates, a master batch is provided that is not oxygen reactive and can be diluted to a lower concentration at the time a film, part, or fitment is made. This allows the master batches to be water quenched without loss of activity during a processing step such as twin screw compound extrusion. It also allows flexible control of the ratio of oxygen scavenger to catalytic agent. Generally, the ingredients for the concentrates are well mixed, using low sheer and good temperature control. In subsequent processing, storage or transport, the concentrate should not be exposed to moisture. In some cases, drying of the master batch prior to extrusion as well as storage of the resulting pellets in high moisture barrier bags is necessary.

When a PAPA chelate, macrocyclic chelate or amino polycarboxylic acid or salicylic acid chelate of a transition metal ion is used as the catalyzing agent in the compositions of this invention, these chelates may also be used to augment the oxygen scavenging properties of the ascorbate compounds. To do so, such chelates should include a lower oxidation state transition metal ion and be used in an amount of between about 0.3 and 33 and preferably, 2.5 to 15 parts per weight based on 100 parts by weight of the polymer (i.e., between 10 and 500, and preferably 50 to 300 micromoles per gram of polymer). Preferred transition metal chelates include polyalkyl polyamines or macrocyclic amine chelates of transition metal ions such as iron, copper, nickel or cobalt. In these polyalkyl polyamine chelates, equal length carbon chains are utilized between adjacent nitrogen atoms, preferably those chains having between 1 and 4, and optimally 2, carbon atoms.

In other embodiments of the invention, these chelates may be utilized alone as the sole oxygen scavenging compositions. In this embodiment, the preferred chelates mentioned above would be used in the same amount as described above for the ascorbates, rather than the amounts used for the chelates as catalysts. If desired, the ascorbate compounds can be included as a reducing agent and would be used in the same amount described above for the ascorbate catalysts. The ascorbates also act as a preservative for the chelate. When the ascorbates are included to augment the oxygen scavenging of the chelates, then the amount used would be the same as described above for the chelates which are used to augment the oxygen scavenging properties of the ascorbates.

Other transition metal chelates containing one or more amine, hydroxyl, carboxylate or sulfhydryl groups, or combinations thereof, may also be used to augment the oxygen absorbing properties of the composition. Transition metal chelates of salicylates or salicylate salts; amino polycarboxylates, such as EDTA; and other polycarboxylates, optionally containing hydroxyl moieties, are representative examples of suitable compounds. Hydroxyethylene diamine triacetic acid, diethylene triamine pentaacatic acid, or trans-1,2-diamino cyclohexane tetraacetic acid can be used. As noted above, however, the transition metal ion should be in a lower oxidation state. Thus, monoferrous disodium EDTA [$Fe^{++}$/EDTA/$2Na^+$] would be preferred, while monoferric monosodium EDTA [$Fe^{+++}$/EDTA/$Na^+$] would be used in combination with a reducing agent, such as sodium ascorbate.

In other embodiments of the invention, these chelates may be utilized alone as the sole oxygen scavenging compositions. In this embodiment, the preferred chelates mentioned above would be used in the same amount as described above for the ascorbates, rather than the amounts used for the chelates as catalysts. If desired, the ascorbate compounds can be included as a reducing agent and would be used in the same amount described above for the ascorbate catalysts. The ascorbates also act as a preservative for the chelate. When the ascorbates are included to augment the oxygen scavenging of the chelates, then the amount used would be the same as described above for the chelates which are used to augment the oxygen scavenging properties of the ascorbates.

In another embodiment of the invention, the oxygen scavenging compositions may be treated to maintain these agents in a dry state before they are dispersed relatively uniformly throughout the polymer. Numerous methods are known for maintaining this dry state, and freeze drying, spray drying, or microencapsulation are preferred due to simplicity of processing. Thereafter, the oxygen scavenging composition will be activated by contact with water or water vapor which permeates into the polymer. Techniques for freeze drying and microencapsulation are well known in the art, and one skilled in the art can select the appropriate encapsulant for the intended application. By such appropriate selection of the encapsulating material, one may protect the enclosed oxygen scavenging compound from the oxygen in air; this would allow longer storage of the prepared oxygen scavenger. After freeze drying, spray drying, or microencapsulation, the materials are then blended with the appropriate carrier and manufactured into the final composition, form and configuration for use in, on or as the product packaging.

By way of example, one way of distributing the oxygen scavenging material throughout a carrier is by preparing direct blend polymers, either as "master batch" concentrates or as final product. As noted above, such concentrates are often preferred because they contain less inert material and are therefore less expensive to manufacture, store and ship. For preparation of a concentrate or "master batch" which will be diluted during manufacture of the final compositions, very high weight percentages of oxygen scavenging ingredients (up to, e.g., greater than 40% and even up to 50%) may be used. Beads of a polymer carrier, such as polyvinyl chloride, low density polyethylene, or ethylene vinyl acetate, are placed between the rollers of a polymer forming mill operating at about 300° F. The back roller of the mill operates at a higher velocity than the front roller. The rollers spin in opposite directions, so that the beads are sheared downward therebetween. As the polymer beads become fluid they spread across the front roller at the thickness set between the rollers.

After the PVC has become heated and softened, the oxygen scavenging compounds to be blended into the polymer are slowly poured into the space between the rollers. The mixing of PVC, LDPE, or EVA and compound is then achieved by cutting the polymer to the center of the mill and then allowing it to spread back out over the roller. This is done 20–30 times until the compounds are well mixed. The mixing may also be done in the standard ways of commercial preparation of various plastic formulations, e.g., by simple addition of oxygen absorbing materials of the invention as an additional ingredient during bulk "dry mixing" of PVC, plasticizer, and other components. In some preferred embodiments, a Banbury style batch mixer or a twin screw continuous mixer of the type commonly used in the resin industry is used to combine the base resin with oxygen scavenging ingredients.

EXAMPLES

The following examples illustrate preferred embodiments of the invention. In each example, the formulation components are designated in parts by weight unless otherwise indicated.

Example 1

Crown liners were prepared from PVC resin containing the oxygen scavenging and catalyzing agents shown in Table I. These liners were placed in bottle crowns which were then used to cap fresh bottled beer. Oxygen measurements were made in six replicate samples immediately after sealing and pasteurizing the bottles, and again after seven days of storage at room temperature. These oxygen measurements were made using a polarographic oxygen probe device from Orbisphere, Inc. Results are shown below in Table I.

TABLE I

| Component | Initial | Control | Samples ($\mu$ moles) | | | |
|---|---|---|---|---|---|---|
| | | | F | G | H | I |
| Sodium Ascorbate | — | — | 50 | 112.5 | 250 | 250 |
| $FeCl_2$ | — | — | 5 | 5 | 5 | — |
| $CuSO_4$ | — | — | — | — | — | 5 |
| Oxygen Content* (ppb) | 415.4 | 229.1 | 135.1 | 106.6 | 83.2 | 121.4 |

*The control and samples F–I were measured after seven days.

These data show that beer, itself, consumes oxygen, which is one cause for the normal limited shelf life of this product. The use of a crown liner made of one of the polymer compositions of the invention results in removal of oxygen over and above that which is normally consumed by the beer. Moreover, the greater the amount of ascorbate used for a particular catalyst, the greater the amount of oxygen that is removed.

Example 2

An Erlenmeyer flask containing a magnetic stir bar is filled with deionized water and corked. The water in the flask is stirred on a magnetic stir plate and flushed with a moderate flow of argon gas for ½ hour until the dissolved oxygen in the water is displaced.

EDTA disodium salt dihydrate and ferrous chloride tetrahydrate, 1:1 mole/mole, are placed in a second Erlenmeyer flask, which also contains a magnetic stir bar. The second flask is flushed with argon gas for ten minutes.

The deoxygenated water in the first flask is then introduced into the second flask (containing the EDTA and ferrous chloride) until the desired amount of liquid has been transferred. The contents are kept under argon, the solution is stirred on a magnetic stir plate, and the pH is adjusted to 5 with 10 M deoxygenated sodium hydroxide.

The solution is then transferred to an argon flushed lyophilization flask and is frozen in liquid nitrogen. The frozen solution is then lyophilized until all water has been removed. Oxygen-contaminated solutions are detectable by a color change from a light green to a red-orange color.

Example 3

A standard PVC lining compound was heated and mixed on a two roller mill via standard practice.

When the proper degree of fluidity was reached, the oxygen scavenging ingredients were added and mixed into the compound. Sheets of compound were removed from the mill, cooled, and cut into pieces small enough to fit into a gas measurement cell. Results are as follows:

| CELL LOADING, ONE GRAM COMPOUND (MOLES FERROUS EDTA/ $\mu$MOLES SODIUM ASCORBATE) | OXYGEN SCAVENGED ($\mu$MOLE/DAY) |
|---|---|
| 0/0 | 1.2 |
| 0/101 | 1.8 |
| 0/252 | 4.0 |
| 0/353 | 4.3 |
| 46/0 | 7.0 |
| 131/0 | 14.4 |
| 209/0 | 17.4 |
| 21/127 | 10.3 |
| 21/208 | 14.1 |
| 42/85 | 12.1 |
| 42/163 | 16.8 |
| 41/245 | 22.2 |
| 2/124 | 14.8 |
| 62/208 | 20.0 |
| 83/83 | 16.5 |
| 82/163 | 21.2 |
| 80/240 | 26.0 |
| 123/123 | 24.8 |
| 156/156 | 30.4 |

The data shows that a standard PVC lining compound will react to a small extent with oxygen. The addition of only sodium ascorbate (i.e., without a source of transition metal catalyst) very slightly increases the reactivity. Ferrous EDTA has a significant effect on the amount of oxygen scavenged. The combination of ferrous EDTA and sodium ascorbate, however, causes a disproportionate increase in oxygen scavenged. Both ferrous EDTA by itself and in conjunction with sodium ascorbate demonstrate significant oxygen removal.

Example 4

Other compounds may advantageously be used in practicing this invention. For example, salicylic acid is a strong chelator for $Fe^{+++}$ (and less so for $Fe^{++}$): the iron of the "chelated $Fe^{++}$" form will rapidly oxidize in the presence of oxygen, analogously to the behavior of $Fe^{++}$ EDTA used in experiments previously described herein. Consequently, an iron complex of salicylic acid (or a salt thereof) is also useful in practicing the present invention. The $Fe^{+++}$ (salicylic acid)$_3$ complex is less soluble in aqueous solution than is the comparable $Fe^{++}$ EDTA complex; consequently such salicylic acid complexes should yield lower rates of leach from container or gasket materials (wherein they are incorporated) into the contained products. Use of these oxygen-scavenging materials would be preferred when the consideration is to minimize the leaching of package components.

Furthermore, it is preferable to utilize the $Fe^{+++}$ (salicylic acid)$_3$ complex in combination with an ascorbate as detailed above, so that the transition metal ions from the complex can serve to catalyze the aerobic oxidation of the ascorbate, and/or the ascorbate can reduce the oxidation state of the ferric ion.

The following experiment illustrates the utility of this combination.

120 micromole/gram finished plastic of $Fe^{+++}$ (salicylic acid)$_3$ and 200 micromole/gram finished plastic of sodium ascorbate were blended together into PVC crown lining materials in accordance with techniques known in the art and as described above.

The resulting plastic material was used to form completed, lined crowns using standard crown making machinery. To test for oxygen uptake capacity, completed liners were then removed from crown shells, wetted with 8% ethanol beer simulant, and placed in glass test chambers filled with air. Oxygen absorption was measured versus time as change in percent oxygen in the air in test chambers for replicate liners. The samples were analyzed using a gas chromatograph with a mass selective as is well known in the art. The results are as follows:

| Sample | micromoles $O_2$ Absorbed (normalized to "per gram of liner") at Hour 3 | 6 micromoles $O_2$ Absorbed (normalized to "per gram of liner") at Hour 27 |
|---|---|---|
| R | 14.0 | 28.6 |
| S | 10.5 | 26.7 |
| T | 10.5 | 26.1 |

To attain the desired combination of characteristics (e.g., low leach rate plus high oxygen absorption potential), certain modifications to simple salicylate salts/complexes suggest themselves. For instance, leach rates might be appreciably lowered by chemically modifying the salicylic complex to be more hydrophobic, hence, less soluble in aqueous media. Certain of these modifications are included in the formulae for suitable salicylic acid derivatives described above.

Example 5

A concentrated low-density polyethylene (LDPE) oxygen scavenging polymer ("master blend") containing 41 weight percent sodium ascorbate and 0.6 weight percent copper sulfate (anhydrous) was prepared as follows. LDPE base resin (Quantum Chemical Corporation, Cincinnati, Ohio) was mixed with the oxygen scavenging ingredients in a Banbury style mixer. The resulting mixture was converted into sheets on a two-roll mill which were then chopped into pellets and extruded into thin films.

To measure oxygen uptake, the thin films were punched into $15/16"$ diameter disks and accurately weighed. The disks, one each, were placed in glass bottles containing 370 mL of air saturated water and no headspace gas and closed with a crown closure. Twice each day, the bottles were agitated to mix the water in the bottle, eliminating oxygen concentration gradients in the bottle. Dissolved oxygen concentration was measured using a polarographic oxygen sensor and the oxygen uptake was calculated by calculating the difference in oxygen concentration between bottles containing the disks and bottles containing no polymer. In general, five containers were measured at each time point.

The oxygen uptake from 2000 $\mu$mole/g ascorbate scavenger and 40 $\mu$mole/g catalyst (normalized using a 0.3 g disk) was 310±70 $\mu$moles $O_2$/g polymer after 24 hours. At that time, all the available oxygen had been consumed from the container (91 $\mu$moles of $O_2$ available in the bottle).

Oxygen uptake from 1000 $\mu$mole/g ascorbate scavenger and 20 $\mu$moles/g catalyst was observed as follows:

| Time | Oxygen uptake ($\mu$moles/g polymer) |
|---|---|
| 24 Hours | 21 ± 4 |
| 48 Hours | 30 ± 11 |
| 72 Hours | 40 ± 5 |

The total oxygen capacity of the oxygen scavenging polymer was also determined. In this case, samples of the above polymers (at 1000 and 2000 $\mu$mole/g ascorbate loading) were frozen in liquid nitrogen and ground in a small grinding mill until all the particles were smaller than 15 mesh. The sample was then dried in a beaker for 1 hour at 50° C. A sample theoretically capable of scavenging 900 $\mu$moles of oxygen (½ the oxygen in the container) was added to a 215 mL container containing 6 mL of water. The container was closed with a crown closure and stored at 50° C. and measured 10, 14 and 21 days after bottling.

The total oxygen capacity from 2000 $\mu$mole/g ascorbate scavenger and 40 $\mu$mole/g catalyst was 2540 $\mu$moles/gram polymer, 127% of the theoretical capacity.

The oxygen uptake from 1000 $\mu$mole/g ascorbate scavenger and 20 $\mu$moles/g catalyst was 1350 $\mu$moles/gram polymer, 135% of the theoretical capacity.

Example 6

The master blend from Example 5 was used to make thin films 0.001 to 0.050 inches in compositions containing ratios of concentrate to base resin of 1:0, 1:1, 1:3, and 1:7. The dilution was accomplished by shaking the desired ratio of master batch and base resin in a clear plastic bag and then dumping the contents into the desired processing equipment. In all the processes, the resin mixture containing mater batch was heated to a molten state and mixed before extruding, blowing film or injection molding. The resulting films were used in ketchup closures, cosmetic closures and fragrance closures. In each case, the appropriate loading of oxygen scavenging material, in the form of tape, was glued to the inside of the gasket of a closure. In the case of ketchup, the headspace oxygen content monitored during the first 6 weeks was as follows. The container was a PET bottle with an oxygen transmission rate of 0.04–0.05 cc/package/day.

|  | Control Closure | $O_2$ Scavenger Closure |
|---|---|---|
| Initial | 20.3% | 20.3% |
| 24 Hour | 18.9% | 17.8% |
| 48 Hour | 18.3% | 16.8% |
| 6 Day | 14.0% | 9.9% |
| 16 Day | 10.7% | 5.2% |
| 29 Day | 8.5% | 2.8% |
| 56 Day | 3.9% | 1.1% |

Headspace oxygen content was measured using an Ingold Instruments polarographic oxygen sensor model IL 307 with a soft package sampling device. To measure the bottle, a septum was applied to the outside of the inner seal of the closure and the inner seal was pierced by the sampling device. The gas inside the bottle was then analyzed for oxygen content by the Ingold analyzer.

Color evaluations were taken after 4 months using a Hunter Color Analyzer. After four months, projected ketchup shelf life in the oxygen scavenger closure package was judged to be 20 months, and the control was judged to be 14 months.

The concentrate was also diluted in ratios of 1:13, 1:19, and 1:39 with base resin to form injection molded fitments. The fitments were made with Dowlex 2553 (Dow Chemical Co., Midland, Mich.) as the base resin. These fitments were tested on ketchup in a barrier bag. The barrier bag was a multi-layer polymer bag with an oxygen transmission rate of 0.05 cc/$100^2$in/day. The fitments were heat sealed into the inside of the bag before the bag was made. One set of samples was held at 90 degrees Fahrenheit and the another set was held at 100 degrees Fahrenheit. After 75 days, color evaluations were made using the Hunter Color Analyzer. No control was run but the bag with the best color retention was the bag containing the 1:13 letdown of the oxygen scavenging concentrate. The difference in effectiveness between the fitments was most pronounced near the top of the bag. In the body of the bag, away from the fitments, the effect was much less pronounced.

Example 7

The method described in Example 5 was used to prepare a concentrate of ethylene vinyl acetate (ELVAX 450, DuPont Company, Wilmington, Del.) having a 19.8 weight percent sodium ascorbate loading and a 0.3 weight percent copper sulfate loading.

The film was made by extruding the EVA compound from a Brabender extruder with a 1 inch wide ribbon die. The tape samples were evaluated for oxygen capacity using the method outlined in Example 5. The oxygen uptake from 1000 $\mu$mole/g ascorbate scavenger and 20 $\mu$moles/g catalyst was as follows:

| Time | Oxygen uptake ($\mu$moles/g polymer) |
| --- | --- |
| 24 Hours | 59 ± 8 |
| 48 Hours | 79 ± 9 |
| 72 Hours | 110 ± 10 |

The total oxygen uptake from 1000 $\mu$mole/g ascorbate scavenger and 20 $\mu$moles/g catalyst was 1380 $\mu$moles/gram polymer, 138% of the theoretical capacity.

Example 8

The master batch LDPE concentrate of Example 5 was combined with LDPE resin in a ratio of 1:1 and 1:7 and made into the following multilayer films: (A) a 3-layer film containing LDPE: Master Batch/LDPE (1:1): LDPE; and (B) a five layer film containing LDPE: Master Batch Tie-layer Resin (7:1): EVOH: Master Batch/Tie-Layer Resin (7:1): LDPE. The multilayer films were prepared using three one inch Killion Extruders with a coat hanger design Killion combining adapter. The extruder was configured in an ABCBA design, capable of extruding 3 different polymers in 5 layers. In each case, the die gaps were adjusted so that each layer was of equal thickness. Film thickness for the 3 layer films ranged from 0.005" to 0.010" and for the 5-layer films they ranged from 0.003" to 0.005".

Oxygen transmission rates of the films were measured using a Mocon oxtran 100 with a Mocon DL200 oxygen Rate Data Logger. To measure oxygen transmission rates, moist nitrogen was passed on both sides of a sample film until no oxygen was detected. Then moist air was blown across one side of the film and the quantity of oxygen migrating through the film was measured. The oxygen transmission rate of the 3-layer LDPE films decreased between 2 to 13 times less than the controls, depending upon pretreatment processes. The Mocon results are shown in the following table:

Oxygen Transmission Rates for 3-layer LDPE Film Samples

| Sample | Thickness (Mils) | Pretreatment | Oxygen Transmission Rate (cc/m$^2$/da) |
| --- | --- | --- | --- |
| control | 5.1 | none | 2270 |
| control | 5.2 | boiled 1 h, N$_2$ | 3160 |
| LDPE/MB (1:1) | 5.0 | none | 1160 |
| LDPE/MB (1:1) | 5.4 | boiled 5 min, N$_2$ | 500 |
| LDPE/MB (1:1) | 5.6 | boiled 1 h, N$_2$ | 240 |
| LDPE/MB (1:1) | 5.5 | 55° C., 21 h, N$_2$ | 190 |

Oxygen transmission rates of the 5-layer films showed that the oxygen transmission rate of the film did not change when exposed to extreme heat and humidity. In contrast, the oxygen transmission rate through a typical 5-layer EVOH laminate increases 10 to 100 times during exposure to extreme head and humidity as experienced during typical retort cycles (40 minutes @ 250° F. and 100% RH).

What is claimed is:

1. An oxygen scavenging concentrate comprising a polymeric carrier which is permeable to oxygen and water or water vapor; a D- or L-ascorbic acid or a salt thereof which is dispersed relatively uniformly throughout the polymeric carrier in an amount ranging from about 10 to 50% by weight of the concentrate, the ascorbic acid or salt thereof being reactive with oxygen after activation with water or water vapor which permeates the polymeric carrier; and a catalyzing agent in an amount effective to increase the rate of reaction of the ascorbic acid or salt thereof with oxygen which is present in or permeates through or into the polymeric carrier.

2. The concentrate of claim 1 wherein the salt of said ascorbic acid is a sodium, potassium or calcium salt of D- or L-ascorbic acid.

3. The concentrate of claim 1 wherein catalyzing agent includes iron, copper, nickel or cobalt.

4. The composition of claim 1 wherein the catalyzing agent is a transition metal compound, complex or chelate.

5. The concentrate of claim 4 wherein the transition metal compound is supplied as a sulfate or chloride salt.

6. The concentrate of claim 5 wherein the transition metal compound is iron sulfate, iron chloride or copper sulfate, and is used in an amount of about 0.3 and 8% by weight of the concentrate.

7. The concentrate of claim 1 wherein the ascorbic acid is sodium ascorbate and the catalyzing agent is copper sulfate.

8. The concentrate of claim 1 wherein the carrier is a polymer selected from the group consisting of polyethylene, ethylene vinyl acetate polymer, polyvinyl chloride, ethylene vinyl alcohol, ethylene/alpha-olefin copolymers, and ethyl-octene copolymers.

9. A two-part oxygen scavenging system comprising:
   a first concentrate including,
     a first polymeric carrier which is substantially free of catalyzing agents and is permeable to oxygen and water or water vapor, and
     D- or L-ascorbic acid or a salt thereof dispersed throughout the first carrier in a concentration of between about 10 and 50% by weight and being reactive with oxygen after activation with water or water vapor; and
   a second concentrate including,
     a second polymeric carrier which is substantially free of the D- or L-ascorbic acid or a salt thereof; and a catalyzing agent dispersed throughout the second carrier in a concentration of between about 0.3 and 8% by weight, the catalyzing agent when combined with the D- or L-ascorbic acid or a salt thereof in a predetermined amount increases the rate of reaction of the D- or L-ascorbic acid or salt thereof with oxygen.

10. The system of claim 9 wherein the first and second carriers are the same.

11. The two-part oxygen scavenging system of claim 9 wherein the D- or L-ascorbic acid or a salt thereof is sodium ascorbate.

12. The two-part oxygen scavenging system of claim 9, wherein the catalyzing agent is copper sulfate.

13. The two-part oxygen scavenging system of claim 9 wherein the first and second polymeric carriers are selected from the group consisting of polyethylene, ethylene vinyl acetate, polyvinyl chloride, ethylene vinyl alcohol, ethylene/alpha-olefin copolymers, and ethyl-octane copolymers.

14. The concentrate of claim 1 wherein said catalyzing agent is selected from the group consisting of iron chloride and copper sulfate.

* * * * *